United States Patent [19]

Fero et al.

[11] Patent Number: 5,244,276
[45] Date of Patent: Sep. 14, 1993

[54] METHOD AND APPARATUS FOR PASSIVE CONTACT TEMPERATURE MEASUREMENTS

[75] Inventors: Arnold H. Fero, Plum Borough; Frank H. Ruddy, Monroeville; John G. Seidel, McCandless, all of Pa.

[73] Assignee: Westinghouse Electric Corp., Pittsburgh, Pa.

[21] Appl. No.: 891,600

[22] Filed: Jun. 1, 1992

[51] Int. Cl.$^5$ .............................. G01N 25/00
[52] U.S. Cl. .................. 374/102; 369/275.4; 374/159
[58] Field of Search ............... 374/208, 102, 106, 165, 374/147, 137, 186, 45, 159; 73/295

[56] References Cited

U.S. PATENT DOCUMENTS

| | | | |
|---|---|---|---|
| 3,059,474 | 10/1962 | Keller et al. | 374/106 |
| 3,182,507 | 5/1965 | Rogen | 374/102 |
| 3,444,740 | 5/1969 | Davis | 374/147 X |
| 3,696,675 | 10/1972 | Gilmour | 73/295 |
| 3,839,898 | 10/1974 | Talboom, Jr. et al. | 374/102 |
| 3,848,466 | 11/1974 | Dial et al. | 374/147 |
| 3,869,919 | 3/1975 | Presser et al. | 374/106 |
| 3,965,724 | 6/1976 | Ambrose | 374/102 |
| 4,167,109 | 9/1979 | Gold | 374/102 X |
| 4,469,452 | 9/1984 | Sharpless et al. | 374/160 |
| 4,876,058 | 10/1989 | Fero et al. | |
| 4,980,118 | 12/1990 | Fero et al. | |

Primary Examiner—Daniel M. Yasich
Attorney, Agent, or Firm—J. C. Valentine

[57] ABSTRACT

An integrated temperature monitor (ITM) is placed in a protective carrier and the carrier is placed in a base. Thermally conductive adhesive is injected around the carrier. A cover is placed on the base, forming a container around the ITM. The adhesive holds the carrier in the container holding the base and cover together. Two screws also hold the base and cover together as the adhesive cures. The base has slots for seizing wire. The container is attached to a device with thermally conductive adhesive and the seizing wire. A bar code label is placed on the container. The end of the container is cut to expose the carrier and monitor and create an opening to remove the ITM from the container.

13 Claims, 1 Drawing Sheet

METHOD AND APPARATUS FOR PASSIVE CONTACT TEMPERATURE MEASUREMENTS

TECHNICAL FIELD

This invention relates generally to techniques for determining the thermal history of equipment and specifically to related methods and apparatus for passive contact temperature measurements using integrated temperature measuring devices ("ITM").

BACKGROUND OF THE INVENTION

U.S. patent application "Apparatus For Determining Thermal History of Equipment Using Solid State Track Recorders", Ser. No. 07/479,060, filed Feb. 27, 1991 now U.S. Pat. No. 5,064,605, that is a continuation of Ser. No. 07/479,060 filed Feb. 1, 1990, abandoned, and assigned to the assignee hereof. The application "Method for Determining An Equivalent Average Temperature Associated With A Thermal History of Equipment", Ser. No. 07/481,040 filed Feb. 16, 1990, is abandoned concurrently with the foregoing application and also assigned to the assignee thereof are concerned, as is this application, with techniques for detecting the thermal aging of equipment.

The properties of many materials change as a result of exposure to temperature. Rubber gaskets may take a permanent set, flexible members may become brittle, organic fluids may decompose and the electrical properties of insulating materials may vary. "Thermal aging" is the reason.

Safety equipment in nuclear power plants are required to be capable of performing properly under specified conditions, including theorized design events. Assurances are often required that the equipment will meet design performance characteristics throughout the installed life of the equipment. Those characteristics can be established through careful design qualification processes and surveillance testing of the equipment.

The qualification process involves establishing the qualified lifetime for the equipment. The qualified lifetime is the period of time for which the equipment has been demonstrated to meet the design requirements for specified operating conditions. The qualified lifetime of equipment may be extended if it can be shown that the service or environment conditions that were originally assumed were overly conservative. Substantiating the reason for an extension requires the application of specific documentation methods, as set out, for example, in section 6.9 of ANSI/IEE-323-984.

The qualification process often requires measuring the temperatures of highly localized equipment rather than the temperature of the environment. Some examples of this are a valve motor operator or limit switch that is heated by heat conduction up from the valve and valve yoke from a hot process fluid (e.g. a steamline) controlled by the valve. Another example is a solenoid valve that is heated by resistance heating when the coil is energized, in addition to the heat produced from a hot process fluid line. The equipment itself is significantly hotter than the area ambient temperature in these examples. In yet another application for these devices, electrical cable is placed in a cable tray and the temperature of the cables is monitored. The cables may sustain substantial temperature elevations due to $IR^2$ losses, depending on the thermal characteristics of the cables and the tray. Fireproofing materials that coat the tray can increase these temperatures.

Methods of taking passive radiation and temperature measurements involve the use of large holders for the temperature monitor. These are not easily mounted directly on the equipment under test. Furthermore, the mass of the monitor, as well as its geometry make contact measurements rather difficult and complex. U.S. Pat. Nos. 4,879,058, 4,490,118 and 5,064,605 discuss this.

One method for passive monitoring of a temperature environment, described in U.S. Pat. No. 4,167,109, involves the use of a solid state track recorder (SSTR). There it is explained that by determining the extent of annealing of the radiation "tracks" in the SSTR, the temperature to which the SSTR has been exposed can be inferred. In general, a passive temperature measuring device may be created by exposing a member, formed from an appropriate material, to an altering agent. Such exposure produces an alteration in the member which undergoes a quantifiable change as a result of exposure to temperature (i.e., the member thus altered is subject to thermal aging). An SSTR is such a passive temperature measuring device. Basically, an SSTR is a member formed from a material, generally a dielectric material, in which, exposure to energetic charged particles results in the formation of observable "tracks" which anneal as a result of exposure to temperature. Basically then, an SSTR is utilized by exposing it to energetic charged particles, such as fission fragments or alpha particles, from a radiation source. The passage of these particles through the SSTR produces a permanent trail or radiation damage along the trajectory of each particle, termed a "track." As a result of this radiation damage, the track is subject to preferential attack to an etchant, thus rendering the track visible upon magnification. If the trajectory of the track were normally incident to the surface of the SSTR, the track would appear as a small round pit in the surface. A type of monitor can consist of different SSTR elements, an assembly often called an a integrating thermal monitor or "ITM".

In an SSTR based monitor, the radiation damage associated with the track reverses itself with exposure to temperature, a thermal aging process referred to as annealing. As a result of this phenomenon, annealed tracks, observed after etching, are smaller. Hence, this process is sometimes referred to as "track fading." Moreover, since the reduction in track size renders some tracks invisible, the density of the tracks is also reduced. Hence, the extent of track annealing (thermal aging) may be quantified by determining the reduction in the average track diameter or the reduction in the track density. Calibration standards are created for each SSTR material by forming a number of test members from the material and exposing these test members to energetic charged particles. The tracks thus formed in the test members are then subjected to annealing at a variety of temperatures for a variety of times.

The Arrhenius function has been used in the past to analyze the results of accelerated thermal aging tests, for example as disclosed in S. Carfagno and R. Gibson, *A Review of Equipment Aging Theory and Technology*, EPRI Report, NP-1558, §8.3 (1980), and to analyze data from naturally occurring particle tracks in naturally occurring glasses (e.g. used in SSTRs) for geological dating purposes, for example as disclosed in D. Storzer, *Fission Track Dating of Volcanic Glasses and the Thermal*

*History of Rocks*, in Earth and Planetary Science Letters, 8, pp 55-60 (1970).

In the Arrhenius function, the value of the activation energy E depends on the particular process. Thus, there are potentially an infinite number of Arrhenius functions, each characterized by a different value of the activation energy term. By varying the value of the activation energy term, an individualized Arrhenius function can be developed to characterize the temperature dependence of the reaction rate for any given process.

The processes associated with thermal aging of equipment can be characterized by Arrhenius functions, as evidenced by the fact that the Arrhenius model has often been used in accelerating aging tests (to extrapolate the results of short time exposure at high temperatures to obtain expected aging effects due to long time exposure at lower temperatures). Thus, the thermal aging process in the equipment to be monitored, for example, a piece of qualified equipment in a nuclear power plant, can be described in an Arrhenius function, characterized by an activation energy which represents the effect of temperature on the rate at which the particular aging process occurs. For example, 50% compression set in a gasket material might have an activation energy of 1.2 eV, whereas a 25% loss in lubricity of lubricant might have an activation energy of 0.8 eV. The activation energy values in this example, which have been arbitrarily assigned for illustrative purposes only, would indicate that the rate of lubricity loss increases more rapidly with increasing temperature than does the rate of gasket compression set.

DISCLOSURE OF THE INVENTION

An object of the present invention is to provide a compact, highly portable passive temperature monitor that can be attached directly to small pieces of equipment (devices), such as limit switches and solenoid valves.

The present invention embraces the a method and apparatus using the placement of temperature monitors such as integrated thermal monitors ("ITM's") in contact with the surface of the piece of equipment. The ITM undergoes thermal annealing, which is characterized by Arrhenius function of time and temperature, allowing the determination of the Arrhenius Equivalent Temperature as a function of the activation energy (ev) for the monitored piece of equipment, which indicates the thermal stress applied to the equipment.

According to the present invention, a temperature monitor such as an ITM, is placed in a container. It rests in the container on a carrier that provides a protective frame between the monitor and the edges of the container. The container is attached to the equipment under measurement with thermally conductive adhesive. To determine the thermal age of the device, the container is removed and one end is cut off allowing the ITM to be removed from the carrier. The carrier protects the ITM when the container end is cut.

According to the invention, the container is constructed of two pieces, a base and a cover. The ITM is placed in a receptacle portion of the carrier and the carrier is placed in the base. Thermally conductive adhesive is placed around the edge of the base and the cover is placed on the base thereby forming the container housing the ITM on the carrier. The adhesive holds the base and cover together.

According to one aspect of the invention, the base and cover are also held together by two screws, one on each end of the container. A feature of the invention is that the base and cover are temperature conductive plastic.

According to another aspect of the invention, the base contains slots for receiving lock wire. The lock wire holds the container tightly to the device. This minimizes the amount of thermal adhesive that is needed between the container and the equipment. It holds the container in place while the adhesive cures.

According to another aspect of the invention, a bar code label is attached to the container for tracking the monitoring device.

A feature of the invention is that it provides a very convenient technique for locating temperature measuring devices on equipment. For instance, the holder can be installed on individual cables on a cables tray. Because of its compactness and ruggedness, the holder can be oriented on a piece of equipment to measure temperature gradients produced along the length of the device in contact with the holder. If the order to the ITMs in the holder are known and the orientation of the holder relative to the piece of equipment is known, the relative amount of annealing that can be observed from the successive ITMs will provide data on the thermal gradient.

Another feature is that the container (with the temperature measuring device inside) can be carried around with other equipment by a technician, ready for installation on a small piece of equipment. The technician can "address" the location of the monitor using the bar code.

Another feature is that the ITM is secure in the case, protected from damage as it is carried. A feature of the invention is that the carrier protects the device when the container is cut-open at one end; it also holds it in place inside the container.

Other benefits and features of the invention will be apparent to one skilled in the art.

BEST MODE FOR CARRYING OUT THE INVENTION

Figure 1:
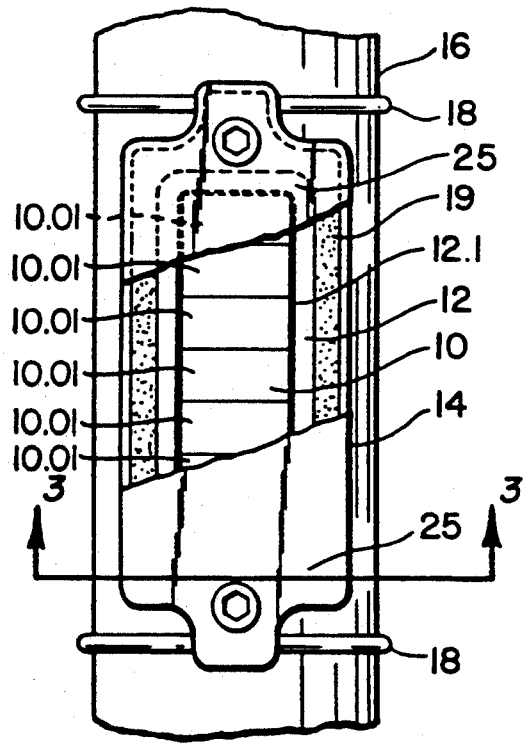
FIG. 1, an elevation of a temperature monitor according to the present invention, is partially cut away, revealing the ITM, carrier and adhesive.

Referring to FIG. an ITM 10 is mounted on a carrier 12 and specifically in a rectangular cutout are a or seat 12.1 in the carrier. The ITM contains metal strips 10. The carrier and ITM are located within an elongated flat case 14. The case is attached to a piece of equipment 16 to monitor the temperature changes it sustains over time. A pair of lock or seizi wires 18 extend around the device and through slots 20 in the case. The base and the cover are held together with thermally conductive adhesive 19 that surrounds the carrier 12 without contacting the carrier, so that the carrier with the monitor may be removed from a sliced-off end of the case 14 (e.g. along line 3—3) In addition, two screws 23 also hold the base 14.1 and cover 14.2 together and are installed after the adhesive 23.

Figure 2:
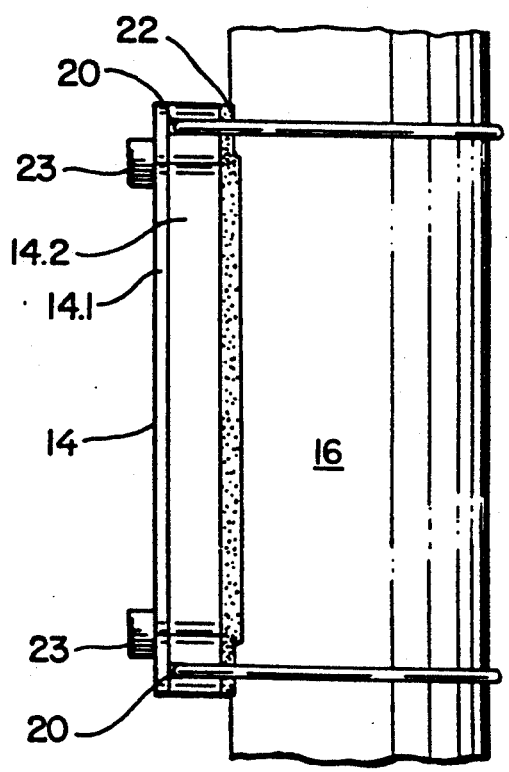
FIG. 2 is a side elevation of the monitor.

FIG. 2 shows that the case 14 consists of two pieces, a top or cover 14.1 and a base 14.2. The case 14 is held on the device 16 by thermally conductive adhesive 22.

A suitable high temperature silicon adhesive is model No. 736RTV available from Dow Cornin. The case and the carrier are made of polyetheretherketone (PEEK), such as ARLON-1000 brand by Green, Tweed Engineered Plastics. This material is selected for its radiation resistance because its properties do not change up to $10^9$ rads and high continuous use temperature as high as 600 deg. F.

Figure 3:
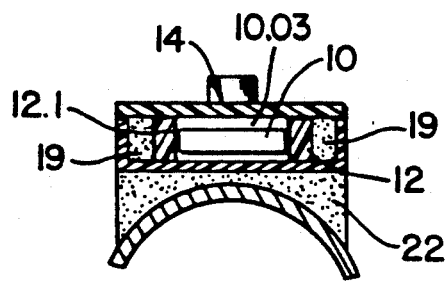
FIG. 3 is a section along line 3—3 in FIG. 1.

The ITM array (the strips 10.01) may consist of a plurality of ITM materials each having different thermal annealing characteristics. This allows the development of the Arrhenius equivalent temperature as function of activation energy. It is well known that the ITM will undergo thermal annealing in a process that is characterized by the Arrhenius function of time temperature thereby allowing the determination of the Arrhenius Equivalent Temperature as a function of activation energy (ev) for the device. The data may be used by the equipment qualification engineer in extending the qualified life of the device. The ITM is nominally 5 mm by 10 mm by 1 mm thick, and the case it not appreciably larger, except to accommodate the carrier frame. The array may be wrapped in aluminum foil within the case. The monitor can bear a unique serial number on an external bar code placed on the case. The bar code can be read in the field or the lab where the ITM is analyzed. When the time comes to read the ITM, it is removed from the case by cutting off the ends at locations 25 (e.g. along line 3—3) with the cuts passing through the ends of the ITM spacer or carrier. As FIG. 3 demonstrates, the cross-sectional profile of the assembly comprising the monitor 10 and carrier 12 is smaller than the cross-sectional profile of the case 14, allowing assembly removal from that end when a portion of it is sliced off. The ITM is removed from the carrier through the open end of the container. Additional cuts can be made along the other (longitudinal) edges of the spacer if necessary to facilitate the removal of the ITM. The carrier, it will be appreciated, protects the ITM when the cuts are made.

While the foregoing is a description of the best mode for carrying out the invention and modifications and variations in particular materials have been discussed, other modifications and variations and material selections may be possible to one skilled in the art having the benefit of the foregoing description.

We claim:

1. Apparatus for measuring the temperature of a device, characterized by:
    a planar case having a base for placement against the device and an attachable cover, said base and cover made of thermally conductive plastic;
    an integrating thermal monitor comprising a plurality of strips with different temperature response characteristics;
    a planar monitor carrier made of thermally conductive plastic, said carrier having a protective frame around a seat holding said monitor and located in the interior of said case, said frame separating said monitor from the edges of said base and said cover and defining a space between said edges and said carrier for adhesive, the monitor being mounted on the carrier to form an assembly with a cross-sectional profile smaller than the cross-sectional profile of one end of the case so that the assembly can be removed through said one end when sliced;
    a removable fastener at each of two ends of said case passing through said cover to said base for holding the base and cover together;
    a slot on said base at each of two ends of said base adapted to receive lock wire; and
    adhesive in said space and separated by a space from said carrier so that the carrier is moveable in the case.

2. A method for measuring the temperature of a device with an integrating thermal monitor, characterized by the steps:
    installing the integrating thermal monitor in a seat in a carrier surrounded by an integral frame, said carrier being made of thermally conductive plastic;
    installing said carrier in a base made of thermally conductive plastic;
    placing thermally conductive adhesive in a space between said carrier and said base and providing a space between the carrier and the adhesive;
    installing a cover on said base to encapsulate said monitor with said cover and said base;
    placing the case on the device with thermally conductive adhesive between said base and the device;
    passing seizing wire through slots in said base and around the device while holding the case against the device;
    removing said case from the device after an elapsed time interval;
    cutting an end of said case to produce an opening across said case;
    removing said carrier through said opening;
    removing said monitor from said carrier and examining said monitor after it is removed from said carrier.

3. An apparatus for measuring the temperature of a device, characterized by at least one temperature recording element for measuring the surface temperature of the device by contacting a surface of the device;
    a container formed from a base and a cover, the container having a cross-sectional profile on a plane at one end; and
    means within said container for receiving said element and providing a protective border between said element and the case, said means being unattached to the case and having a profile adapted to fit within said cross-sectional profile when said one end is cut at said plane.

4. The apparatus described in claim 3, further characterized by slots on said base for receiving fastening wire to hold the case to said device.

5. The apparatus described in claim 3, characterized in that said temperature measuring element is an integrating thermal monitor.

6. The apparatus described in claim 3, characterized by adhesive between said means and said edges, said adhesive holding the case and base together and said means in the base.

7. The apparatus described in claim 3, further characterized in that said base, cover and said means are made of thermally conductive plastic.

8. The apparatus described in claim 3 further characterized by a pair of screws for holding the base and cover together.

9. The apparatus described in claim 4, further characterized by adhesive between said means and said edges, said adhesive holding the case and base together.

10. The apparatus described in claim 4, further characterized in that said base, cover and said means are made thermally conductive plastic.

11. The apparatus described in claim 4 further characterized by a pair of screws for holding the base and cover together.

12. A method for measuring the heat radiated by equipment, characterized by the steps:

installing a temperature measuring means having at least one sensor on a carrier;

installing said carrier on a base;

placing a cover on said base to form a closed container with said measuring means inside;

attaching said container to contact a surface of the equipment;

removing said container from the equipment after an elapsed period of time;

cutting an end on said container;

removing said temperature measuring means from said carrier and determining the heat from the condition of the sensor.

13. The method described in claim 12, further characterized by:

injecting adhesive into a space between outer edges of said carrier and said base and providing space between the carrier and the adhesive so that the carrier can move within the container.

* * * * *